(12) United States Patent
Chauhan et al.

(10) Patent No.: US 11,466,217 B2
(45) Date of Patent: Oct. 11, 2022

(54) PROCESS OF PRODUCING LIQUID FUELS FROM COAL USING BIOMASS-DERIVED SOLVENTS

(71) Applicant: Battelle Memorial Institute, Columbus, OH (US)

(72) Inventors: Satya P. Chauhan, Powell, OH (US); Daniel B. Garbark, Blacklick, OH (US); Herman P. Benecke, Columbus, OH (US); H. Nicholas Conkle, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 89 days.

(21) Appl. No.: 15/760,064

(22) PCT Filed: Sep. 19, 2016

(86) PCT No.: PCT/US2016/052441
§ 371 (c)(1),
(2) Date: Mar. 14, 2018

(87) PCT Pub. No.: WO2017/049271
PCT Pub. Date: Mar. 23, 2017

(65) Prior Publication Data
US 2019/0153328 A1 May 23, 2019

Related U.S. Application Data

(60) Provisional application No. 62/220,681, filed on Sep. 18, 2015, provisional application No. 62/220,729, filed on Sep. 18, 2015, provisional application No. 62/220,761, filed on Sep. 18, 2015, provisional application No. 62/380,731, filed on Aug. 29, 2016.

(51) Int. Cl.
*C10G 65/12* (2006.01)
*C10G 1/06* (2006.01)
*C10G 65/10* (2006.01)

(52) U.S. Cl.
CPC ............ *C10G 1/065* (2013.01); *C10G 65/10* (2013.01); *C10G 2300/1014* (2013.01); *C10G 2400/04* (2013.01); *C10G 2400/08* (2013.01); *Y02P 30/00* (2015.11)

(58) Field of Classification Search
CPC . C10G 1/065; C10G 65/12; C10G 2300/1014
See application file for complete search history.

(56) References Cited

U.S. PATENT DOCUMENTS

| 4,247,384 A * | 1/1981 | Chen | C10G 1/083 |
| | | | 208/430 |
| 4,303,496 A | 12/1981 | Rudnick | |
| 4,409,089 A | 10/1983 | Rudnick | |
| 5,792,340 A | 8/1998 | Freel et al. | |
| 5,961,786 A | 10/1999 | Freel et al. | |
| 7,691,159 B2 | 4/2010 | Li | |
| 7,905,990 B2 | 3/2011 | Freel | |
| 8,519,206 B2 | 8/2013 | Holtzapple et al. | |
| 8,961,743 B2 | 2/2015 | Freel | |
| 9,534,176 B2 | 1/2017 | Kennel et al. | |
| 2008/0047876 A1 | 2/2008 | Keller | |
| 2008/0139418 A1 | 6/2008 | Cioletti | |
| 2009/0250381 A1 | 10/2009 | Fan et al. | |
| 2010/0159522 A1 | 6/2010 | Cirakovic | |
| 2011/0230688 A1 | 9/2011 | Charon et al. | |
| 2012/0091042 A1* | 4/2012 | Stiller | C10G 1/002 |
| | | | 208/435 |

(Continued)

FOREIGN PATENT DOCUMENTS

CN 103305252 A * 9/2013
CN 103305252 A 9/2013

(Continued)

OTHER PUBLICATIONS

International Search Report for International Application No. PCT/US2016/052441, dated Feb. 6, 2017.
Written Opinion of the International Searching Authority for PCT/US2016/052441, dated Feb. 6, 2017.
International Search Report from PCT Application No. PCT/US2018/042106, dated Oct. 12, 2018.
Written Opinion from PCT Application No. PCT/US2018/042106, dated Oct. 12, 2018.

(Continued)

*Primary Examiner* — Randy Boyer
(74) *Attorney, Agent, or Firm* — Greer, Burns & Crain, Ltd.

(57) ABSTRACT

A process of producing a distillate fuel from coal includes: preparing a biomass-derived coal solvent; dissolving the coal in the biomass-derived solvent; and separating undissolved coal and mineral matter to produce a syncrude. In certain embodiments, the process further includes subjecting the syncrude to a hydrotreatment/hydrogenation process to produce a distillate fuel. In certain embodiments, the biomass-derived solvent is a hydrogen-donor solvent. A method to improve direct coal liquefaction includes: using a non-hydrogenated lipid in a direct coal liquefaction process to facilitate coal depolymerization. In certain embodiments, the lipid is a polyunsaturated biobased oil. A method for using a biomass-derived feedstock as a hydrogen donor includes: providing a biomass-derived feedstock; modifying the feedstock to improve its usefulness as a hydrogen donor; and conducting a transfer hydrogenation process using the modified feedstock as a hydrogen donor. In certain embodiments, the transfer hydrogenation process is a direct coal liquefaction process.

19 Claims, 3 Drawing Sheets

(56) References Cited

U.S. PATENT DOCUMENTS

| | | |
|---|---|---|
| 2012/0304529 A1 | 12/2012 | O'Connor et al. |
| 2013/0338411 A1 | 12/2013 | Sharma |
| 2016/0032196 A1 | 2/2016 | Abdullah et al. |
| 2016/0130202 A1 | 5/2016 | Barta et al. |
| 2016/0145497 A1 | 5/2016 | Lattner et al. |
| 2019/0309226 A1* | 10/2019 | Yurchick .............. C04B 38/064 |

FOREIGN PATENT DOCUMENTS

| | | |
|---|---|---|
| CN | 102344823 B | 1/2014 |
| WO | 2011117705 A2 | 9/2011 |
| WO | 2012005784 A1 | 1/2012 |
| WO | 2013177162 A2 | 11/2013 |
| WO | 2017049271 A1 | 3/2017 |
| WO | 2017052454 A1 | 3/2017 |

OTHER PUBLICATIONS

International Search Report from PCT Application No. PCT/US2018/042103, dated Dec. 17, 2018.
Written Opinion from PCT Application No. PCT/US2018/042103, dated Dec. 17, 2018.

* cited by examiner

PROCESS OF PRODUCING LIQUID FUELS FROM COAL USING BIOMASS-DERIVED SOLVENTS

CROSS-REFERENCE TO RELATED APPLICATIONS

This application is a U.S. National Phase under 35 U.S.C. § 371 of co-pending International Application No. PCT/US2016/052441, entitled PROCESS OF PRODUCING LIQUID FUELS FROM COAL USING BIOMASS-DERIVED SOLVENTS, filed Sep. 19, 2016, which claims the benefit of U.S. Provisional Application No. 62/220,681 filed Sep. 18, 2015; U.S. Provisional Application No. 62/220,729 filed Sep. 18, 2015; U.S. Provisional Application No. 62/220,761 filed Sep. 18, 2015; and U.S. Provisional Application No. 62/380,731 filed Aug. 29, 2016, each of which is incorporated herein by reference in its entirety.

BACKGROUND OF THE INVENTION

This invention relates in general to processes and systems for converting carbonaceous feedstocks to liquid hydrocarbons and, more particularly, to the production of liquid fuel products from coal. The invention also relates to methods of improving solubilization of coal by transfer hydrogenation due to the action of hydrogen-donor, biomass-derived solvents.

As energy consumption in the United States and throughout the world continues to increase, additional methods for environmentally clean energy conversion that can convert coal, biomass, or other solid or nonconventional heavy hydrocarbon energy resources to synthetic fuels, hydrogen and chemicals are desired. Concerns about the increased wastes and pollutants produced by many of the conventional energy conversion processes, and the low efficiencies of such processes, have led to further research for cleaner, more efficient processes.

Processes for producing liquid fuel products from coal are well known. These include indirect coal liquefaction and direct coal liquefaction processes. One of the more common indirect liquefaction processes for the conversion of coal to liquid hydrocarbon fuels involves Fischer-Tropsch processes whereby synthesis gas, or syngas, is converted into liquid fuel products of various forms. Synthesis gas for use in the Fischer-Tropsch process may be produced by the gasification of coal which produces carbon monoxide and hydrogen.

Direct coal liquefaction processes convert coal into liquids directly, without the intermediate step of gasification, by breaking down its organic structure with application of solvents and/or catalysts in a high pressure and temperature environment. In some direct coal liquefaction processes, the solvent causes dissolution of the coal by transferring hydrogen from the solvent to the fragments of coal generated during the initial, thermal breakdown of coal during coal liquefaction, which stabilizes the coal fragments and avoids their recombination into tar-like, undesirable products. Such a process is known as "transfer hydrogenation", and such solvents are referred to as hydrogen-donor solvents. The "gold standard" for transfer hydrogenation and solubilization of coal is 1,2,3,4-tetrahydronaphthalene (tetralin). But tetralin is typically derived from fossil fuels and is expensive. The tetralin, like other hydrogen-donor solvents, undergoes dehydrogenation during coal liquefaction and needs to be regenerated in order to reduce the cost of make-up tetralin.

It would be desirable to provide a new process for the production of liquid fuel products from coal using biomass-derived solvents. It would also be desirable to provide a process capable of producing jet fuels and other distillate fuels. It would further be desirable to provide a process that limits greenhouse gas emissions without requiring carbon capture and storage. It would also be desirable to provide methods of improving solubilization of coal by transfer hydrogenation.

It would also be desirable to provide materials to improve direct coal liquefaction processes. It would further be desirable to provide materials that are economical and environmentally friendly.

It would also be desirable to provide methods to improve the industrial usefulness of biomass, and in particular methods to modify biomass-derived feedstocks to improve their usefulness as hydrogen donors in transfer hydrogenation processes.

SUMMARY OF THE INVENTION

A process of producing a distillate fuel from coal includes: preparing a biomass-derived coal solvent; dissolving the coal in the biomass-derived solvent; and separating undissolved coal and mineral matter to produce a syncrude. In certain embodiments, the process further includes subjecting the syncrude to a hydrotreatment/hydrogenation process to produce a distillate fuel. In certain embodiments, the biomass-derived solvent is a hydrogen-donor solvent.

A method to improve direct coal liquefaction includes: using a non-hydrogenated lipid in a direct coal liquefaction process to facilitate coal depolymerization. In certain embodiments, the lipid is a polyunsaturated biobased oil.

A method for using a biomass-derived feedstock as a hydrogen donor includes: providing a biomass-derived feedstock; modifying the feedstock to improve its usefulness as a hydrogen donor; and conducting a transfer hydrogenation process using the modified feedstock as a hydrogen donor. In certain embodiments, the transfer hydrogenation process is a direct coal liquefaction process.

DETAILED DESCRIPTION OF THE PREFERRED EMBODIMENTS

A hybrid, direct coal-to-liquids (CTL) process is provided for producing a syncrude from coal using a biomass-derived coal solvent, and for converting the syncrude into jet fuel and other distillate fuel such as gasoline or diesel. The process may offer a significant reduction in capital and operating costs compared with other CTL processes, as well as to help meet the requirements of secure jet fuel supply while requiring minimal blending with petroleum-based JP-8/Jet-A fuels.

The process may also offer a substantial reduction in greenhouse gas emissions, without requiring carbon capture and storage (CCS) at the coal liquefaction site. The process is expected to meet the requirements for limiting greenhouse gas emissions under United States Section 526 of Energy Independence and Security Act of 2007 (EISA 2007).

The invention also relates to methods of improving solubilization of coal by transfer hydrogenation. Testing has shown that a number of biomass-derived hydrogen-donor coal solvents according to the invention can achieve greater than 80% coal solubility. The coal solubility levels in many cases are equal to or higher than for liquefaction with tetralin. For example, the solubility for an Ohio bituminous coal at 400° C. and 30 minutes residence time with biomass-derived solvent, BS-40D, using a solvent/coal weight ratio of 0.48 was 92.1% (on a moisture- and ash-free basis) compared to 84.9% with tetralin at a solvent/coal weight ratio of 0.60. This demonstrates that the biomass-derived BS-40D is a more effective as well as more efficient solvent than tetralin.

In certain embodiments, the coal-to liquids process includes three subsystems: (1) preparation of a biomass-derived coal solvent; (2) coal dissolution in the biomass-derived solvent, without use of molecular $H_2$, followed by separation of undissolved coal and mineral matter to produce a syncrude; and (3) hydrotreatment/hydrogenation of the syncrude to produce jet fuel and other distillate fuels. Examples of the subsystems are described below.

In other embodiments, the coal-to liquids process includes two subsystems: (1) preparation of a biomass-derived coal solvent; and (2) coal dissolution in the biomass-derived solvent, without use of molecular $H_2$, followed by separation of undissolved coal and mineral matter to produce a syncrude. The syncrude may be sent to an existing petroleum refinery and used as a feedstock in the production of fuels and/or other materials. For example, it may be used to produce jet fuel, other distillate fuels, and chemicals.

Subsystem 1. Preparation of Biomass-Derived Coal Solvent

Figure 1:
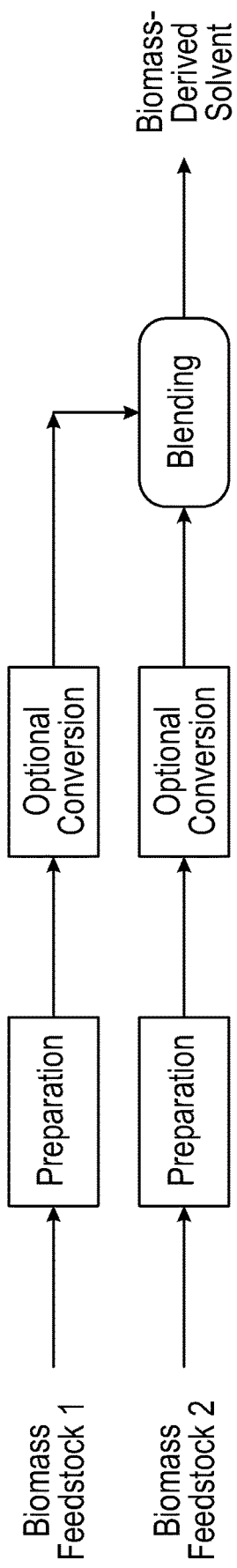
FIG. 1 is a flowchart of Subsystem 1 of the coal-to liquids process of the invention: the preparation of a biomass-derived solvent.

FIG. 1 illustrates an embodiment of Subsystem 1 of the process: preparation of a biomass-derived coal solvent. In certain embodiments, the biomass-derived coal solvent may be a one- or multiple-component solvent.

The biomass-derived coal solvent includes a hydrogen-donor solvent. The hydrogen-donor solvent is a fairly strong hydrogen-transfer solvent that can dehydrogenate and give up hydrogen to newly formed coal fragments during the process of producing a syncrude from the coal. This solvent may also solvate the coal and coal-derived fragments. FIG. 1 shows the preparation of a hydrogen-donor solvent from a Biomass Feedstock I. A number of different biomass-derived hydrogen-donor solvents according to the invention are described in more detail hereinbelow.

Optionally, the biomass-derived hydrogen-donor solvent can be chemically converted/modified to improve its usefulness as a hydrogen-donor solvent in the present process. For example, the conversion may result in at least one of: improved stability, improved resistance to decomposition at elevated temperature, improved solvent ability, and removal of non-useful matter in the biomass feedstock. The conversion is described in more detail hereinbelow.

In some embodiments, the biomass-derived coal solvent includes a second biomass-derived solvent in addition to the hydrogen-donor solvent. FIG. 1 shows the preparation of the second solvent from a Biomass Feedstock II. The second solvent can help to slurry/depolymerize/solvate the coal during the process of producing a syncrude from the coal. In certain embodiments, the second solvent may enhance the action of the hydrogen-donor solvent and/or it may provide a desired aliphatic-aromatic balance in the jet fuel and other distillate products. In other embodiments, the second solvent may help to increase the hydrogen content of the coal-derived syncrude, in order to reduce the cost of upgrading the syncrude to distillate fuels. A number of different second biomass-derived solvents according to the invention are described in more detail hereinbelow.

As shown in FIG. 1, the biomass-derived hydrogen-donor solvent is blended with the second biomass-derived solvent to produce the biomass-derived coal solvent for use in Subsystem 2 of the process. Optionally, one or more additional biomass-derived solvents may be included in certain embodiments.

Advantageously, the biomass may be converted to bio-solvent in a small, distributed plant (e.g., less than 200 TPD, for example about 100 TPD) near the sources of biomass so the energy and cost required for biomass transport is greatly reduced. Additionally, the bio-solvent is easily pumpable compared to cellulosic and other plant mass.

Subsystem 2. Coal Dissolution in Biomass-Derived Solvent

Figure 2:
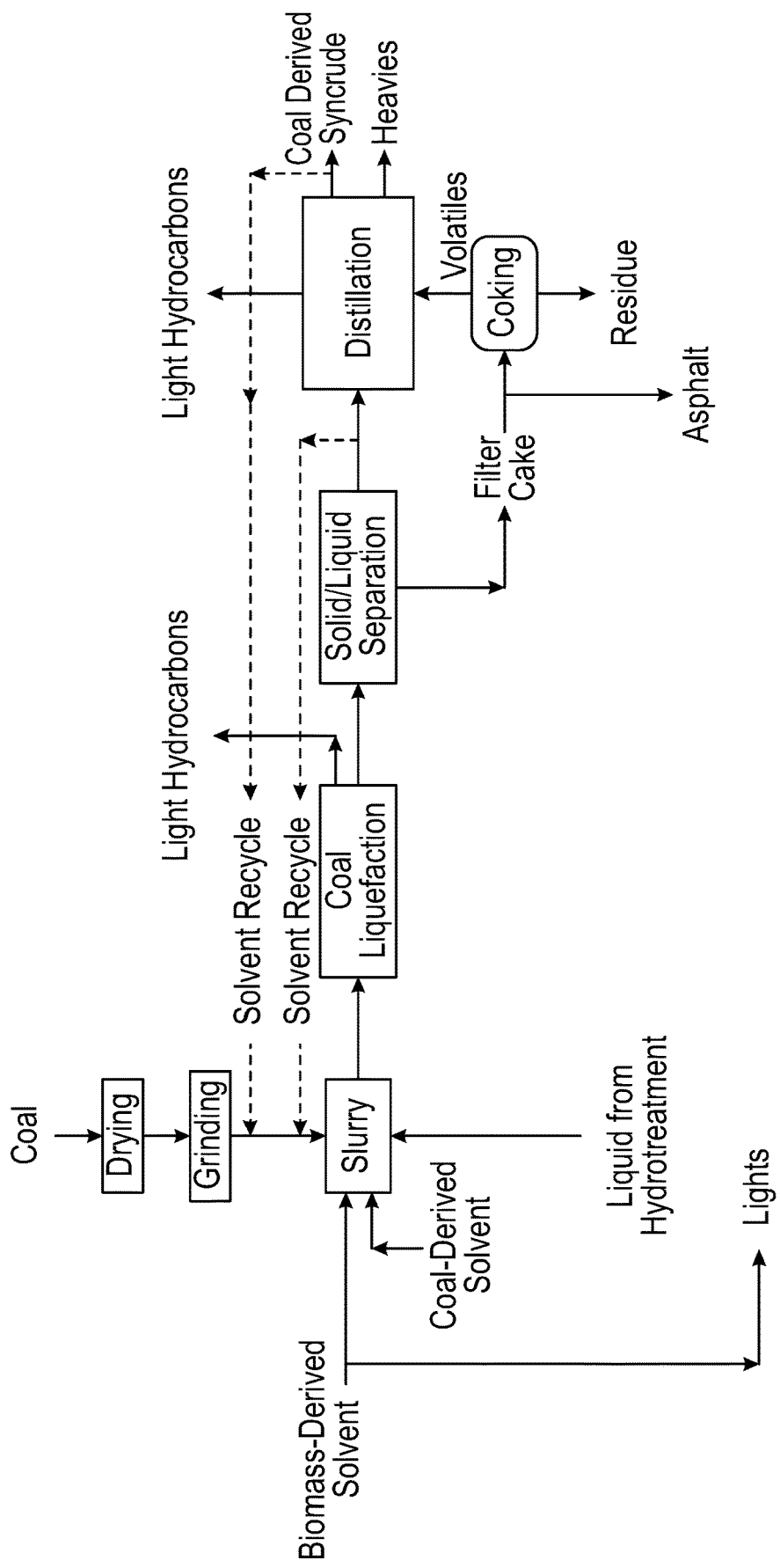
FIG. 2 is a flowchart of Subsystem 2 of the process: coal dissolution/demineralization and hydrogen transfer to produce a coal-derived syncrude.

FIG. 2 illustrates an example of Subsystem 2 of the process: coal dissolution/demineralization and hydrogen transfer in the biomass-derived solvent.

In the embodiment shown, the biomass-derived solvent from Subsystem 1 of the process is pumped to a slurry prep vessel. Optionally, a portion of the biomass-derived solvent, which is already in the distillate fuel boiling point range, may be sent to hydrotreatment/hydrogenation along with the coal-derived syncrude.

Figure 3:
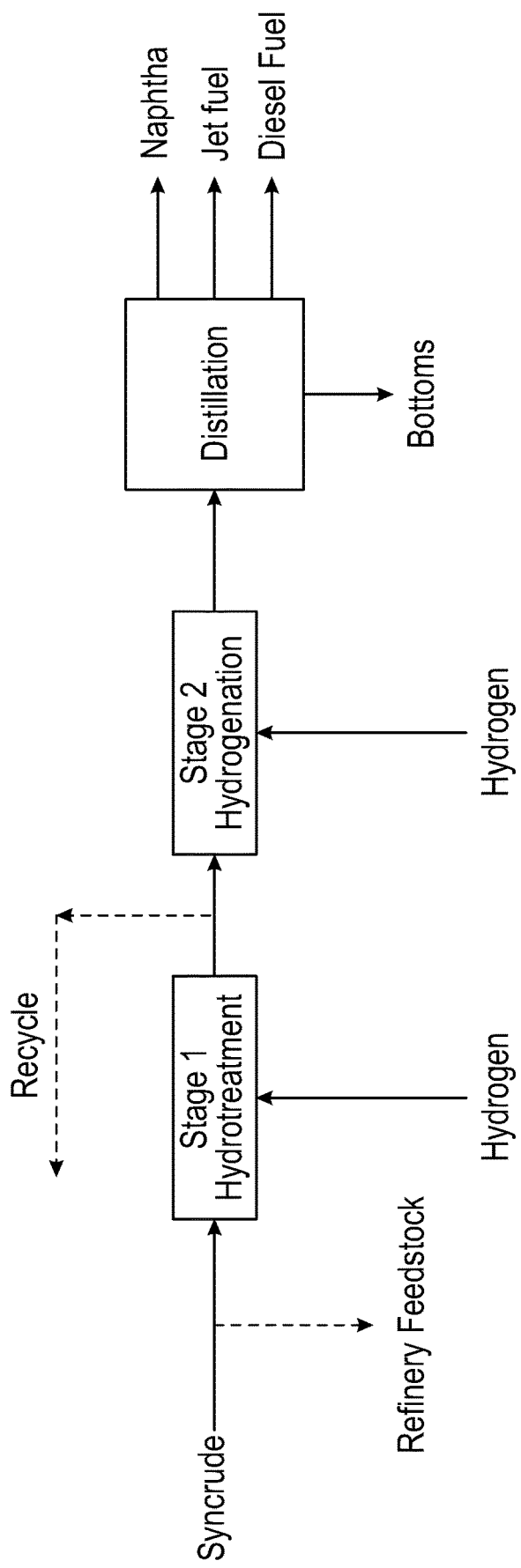
FIG. 3 is a flowchart of Subsystem 3 of the process: two-stage hydrotreatment/hydrogenation of the coal-derived syncrude to produce jet fuel and other distillate fuels.

Typically, a coal-derived solvent is also pumped to the slurry prep vessel to provide a sufficient amount of liquid to slurry the coal. For example, the coal-derived solvent may be a coal tar distillate (CTD). Different types of coal-derived solvents are described hereinbelow. In certain embodiments the coal-derived syncrude, and/or the middle-boiling-point fraction of it, is recycled to eliminate or greatly reduce the CTD, so the CTD essentially becomes a start-up solvent. In certain embodiments, a portion of the coal liquefaction product from the present process (e.g., the "liquid produced after stage 1 hydrotreatment" as shown in FIGS. 2 and 3) may be recycled to further enhance the solvation capability of the biomass-derived solvent. For example, the substitution of 25% of a biomass-derived solvent by the stage 1 hydrotreatment product increased the coal solubility for an Ohio coal from 73.8% to 89.1%. The coal-derived solvent has functional groups, e.g., aromatic and hydroaromatic compounds, that have affinity for coal; these groups help to depolymerize/solvate the coal. The solvents are mixed in the slurry prep vessel.

The process can be used with any type of coal, including bituminous and subbituminous coals, and lignite. In certain embodiments, the process can also be used with bitumen from oil sands. For the sake of brevity, the term "coal" as used in the description and claims will include both coal and bitumen from oil sands. Some examples of coal are West Virginia (high-volatile A bituminous), Ohio (high-volatile A bituminous), and Wyoming (subbituminous) coals. An example of bitumen is the bitumen obtained from the Athabasca oil sands in Canada. In certain embodiments, the invention relates to transfer hydrogenation of a non-coal feedstock. For example, the feedstock may be a non-coal carbonaceous feedstock such as bitumen or others.

The coal may be dried, ground to a reduced size sufficient for dissolution, and then pumped to the slurry prep vessel along with the solvent(s). The coal and solvent(s) are mixed together to form a slurry.

In certain embodiments (not shown), water is removed from the slurry before the coal liquefaction step. For example, the slurry may be passed through a colloidal mill or a suitable slurry-mix tank which heats and recirculates the slurry to drive off water.

The slurry is fed to a digester for coal liquefaction. The slurry is heated in the digester to dissolve the coal and to transfer hydrogen from the biomass-derived solvent(s) to coal-derived fragments/molecules. The coal liquefaction may be conducted using any suitable process conditions. For example, the temperature may be within a range from about 300° C. to about 500° C., or more particularly from about 325° C. to about 475° C. The pressure may typically be within a range of from about 400 psi to about 1200 psi, and more particularly from about 500 psi to about 900 psi, depending on the vapor pressure of the solvent(s). The slurry is held in the digester for a residence time suitable for coal liquefaction, for example a time of from about 2 minutes to about 120 minutes, and more particularly from about 5 minutes to about 45 minutes. In certain embodiments, two digesters in series are used in the process and the reaction conditions are adjusted accordingly.

As the coal is heated in the liquid solvent(s), the coal begins to depolymerize where coal platelets are dissociated and coal macromolecules break up, due to thermally-induced chemical bond cleavage, into smaller, still fairly large molecular weight fragments. The fragments are deficient in hydrogen and will recombine (repolymerize) to make heavy tar or eventually coke if hydrogen is not quickly transferred to these fragments. The biomass-derived hydrogen-donor solvent rapidly provides the much needed hydrogen and thereby prevents repolymerization of the coal fragments. For example, in the absence of any biomass-derived or other hydrogen-donor solvent like tetralin, the product of liquefaction at 400° C. was impossible to filter because of its tar-like, high-viscosity consistency, while the product with biomass-derived solvent was easy to filter and had viscosities that were 1-2 orders of magnitude lower.

The present coal liquefaction process may provide a number of advantages compared with previously known processes. For example, catalytic hydroliquefaction is considered the state-of-the-art, whereby molecular hydrogen at a pressure typically over 2000 psi is first dissolved in a coal-derived solvent and then a solid-phase catalyst rather slowly transfers the dissolved hydrogen to coal/coal fragments. In the present process, the elimination of the need for catalyst, high pressure, and longer liquefaction time are major simplifications compared with the catalytic hydroliquefaction process. Furthermore, the state-of-the-art processes are also complicated due to the need to regenerate the coal solvent, including any hydrogen-donor solvent, to keep the overall process in "solvent balance". However, in the present process the biomass-derived solvents, which contain the needed hydrogen for transfer hydrogenation, can be used on a once-through basis, thus eliminating the need to regenerate the solvent during the coal liquefaction subsystem.

Some previously known "solvent refining" processes produce a dissolved coal product which is solid at room temperature as very little hydrogen is added. In contrast, the present process significantly increases the hydrogen content of the dissolved coal fraction as the biomass-derived hydrogen-donor solvent is rich in hydrogen. The syncrude thus produced has at least 5% and typically over 20% more hydrogen than the starting coal. In an example, the hydrogen to carbon atomic ratio, H/C, for Ohio coal was 0.85, while the H/C for the syncrude was 0.99.

Referring again to FIG. 2, the product from the digester is depressurized and cooled and then fed to a solid/liquid separation device, such as a centrifuge or filter. In the solid/liquid separation step, undissolved coal and liberated mineral matter is separated from the liquefied coal. The separated solids (called the "filter cake") can be used as an asphalt additive, burned to generate heat, or gasified to generate syngas. Optionally, the filter cake can be coked to recover trapped coal-derived syncrude and a high ash residue. The syncrude ("volatiles") may be combined with the liquefied coal in a distillation step. The high ash residue may be used as a feedstock for road aggregate or other suitable application.

The liquefied coal from the solid/liquid separation is fed to any suitable type of distillation device to split the liquefied coal into low-, middle- and high-boiling fractions. The low-boiling fraction (light fraction) and the middle-boiling fraction (middle fraction) are recovered as a coal-derived syncrude according to the invention. The typical upper boiling point of the middle fraction is 450-500° C. The very light hydrocarbons (liquefied petroleum gases and various carbon oxides) from the dissolver and the distillation column are combined and then are typically burned to produce electricity. The syncrude is a low viscosity liquid. In certain embodiments, the viscosity of the syncrude is in the 10 to 300 centipoise (cP) range. The syncrude is sent for hydrotreatment/hydrogenation in Subsystem 3 of the process.

In certain embodiments, as shown in FIG. 2, a portion of the middle fraction is recycled for slurrying the coal. In other embodiments, a portion of undistilled liquid from the solid/liquid separation step is also recycled for slurrying coal.

The high-boiling fraction (heavy fraction) ("low-ash heavy product" in FIG. 2) can be sold as pitch or coked to recover more liquefied coal and produce a high-value coke. A portion of the heavy fraction can be recycled to the slurry prep vessel.

Advantageously, smaller coal liquefaction plants (e.g., 300-1000 TPD), typically located near a coal mine, are economical to use with the present process due to the use of non-catalytic, mild conditions that do not require the use of molecular hydrogen and the associated infrastructure to produce hydrogen, so coal transportation energy and cost are reduced as well.

Subsystem 3. Hydrotreatment/Hydrogenation of Syncrude

FIG. 3 illustrates an embodiment of Subsystem 3 of the process: hydrotreatment/hydrogenation of the coal-derived syncrude to produce jet fuel, diesel fuel, naphtha, and optionally, gasoline.

In certain embodiments, the hydrotreatment/hydrogenation is a two-stage process. In other embodiments, it is a one-stage process. In some further embodiments, the hydrotreatment/hydrogenation is a one-stage process used to produce a fuel, which may be a distillate fuel or another type of fuel.

As shown in FIG. 3, the coal-derived syncrude from Subsystem 2 of the process is fed to a reactor for the Stage 1 hydrotreatment process. Stage 1 is designed to remove the major heteroatoms found in coal: nitrogen, oxygen and sulfur (N, O, and S, respectively). To free N (hydrodenitrogenation, or HDN), O (hydrodeoxygenation, or HDO), and S (hydrodesulfurization, or HDS) from the carbon backbone, the process hydrocracks and breaks the connecting bonds, allowing these atoms to be freed and subsequently reacted with gaseous hydrogen ($H_2$) for conversion primarily into ammonia ($NH_3$), water ($H_2O$), and hydrogen sulfide ($H_2S$). In an example, the hydrotreatment achieves 99.7% HDN (reduction of N from 7,200 ppm wt % to 21 ppm wt %) and 99.7% HDS (reduction of sulfur from 5,552 ppm wt % to 17 ppm wt %). The 17 ppm sulfur remaining is significantly better than the 3,000 ppm wt % Jet A sulfur limit. In certain embodiments, the hydrotreatment can reduce greater than 99.9% of the nitrogen and greater than 99.9% of the sulfur. In certain embodiments, the residual oxygen is reduced to below the analysis limit.

At the same time, hydrogen is added at the sites of the bonds breakage allowing the H/C ratio (hydrogen to carbon atomic ratio) to be increased. The process also reduces aromaticity by converting some aromatics to hydroaromatics and cycloparaffins. For example, the process results in significant conversion of molecules such as naphthalene, fluorene, phenathrene, fluoranthene and chrysene. In an example, the H/C mole ratio is increased from 0.99 (in the feed) to 1.51 after the hydrotreatment.

An option exists to recycle a portion of the product from Stage 1 to coal liquefaction (Subsystem 2) to increase the amount of hydrogen-donor capacity.

The product from Stage 1 is fed to a Stage 2 hydrogenation process. The processes of Stage 1 and Stage 2 may be conducted in different zones of a single reactor or conducted in different reactors. Stage 2 is designed to achieve hydrodearomaticization (HDA) by additional hydrocracking to chop the liquefied coal molecule into a carbon-number range (and boiling range) consistent with distillate fuels. In certain embodiments, the product of the hydrogenation process has a molecular length in the jet and diesel carbon-number range. For example, the product may have a carbon number distribution within a range from about carbon number 8 to about carbon number 17. Further HDN, HDO, and HDS is also achieved in Stage 2 as more bonds are cracked. This additional hydrogenation further improves the H/C ratio to above about 1.75.

The product from Stage 2 is fed to a distillation process. The distillation process is designed to first distill the cracked liquids to remove gases and naphtha (light hydrocarbon liquids like propane, butane and pentane). In a subsequent vacuum column the distillate fraction (molecules in the jet and diesel boiling range) are separated from the partially upgraded but still "heavy" fraction (high-molecular weight, high-boiling material collected from the bottom of the vacuum column). The bottoms may be recycled back to Stage 2 for further cracking—so it is not necessary to reduce all the molecules to the $C_8$ to $C_{17}$ jet range or the $C_{12}$ to $C_{22}$ diesel range in a single pass to achieve success.

Because the hydrotreatment/hydrogenation is typically conducted in two stages, different catalysts and different operating parameters may be employed to effect the desired conversion. The catalysts and operating conditions can be selected to optimize the quality and yield of jet fuel fraction. Any suitable catalysts can be used. For example, NiMo and CoMo catalysts may be used in Stage 1 for removal of the heteroatoms (O, N and S) components and to partially hydrogenate aromatic compounds. NiW, Pt and PtPd are examples of catalysts that may be used in Stage 2 to complete the upgrading of the syncrude to a jet fuel or diesel product.

Also, any suitable operating conditions can be used. For example, the Stage 1 reaction may be operated at a temperature within a range from about 340° C. to about 425° C., a pressure within a range from about 600 psi to about 1500 psi, and a hydrogen/syncrude volume ratio within a range from about 3,000 scf/bbl to about 20,000 scf/bbl. For example, the Stage 2 reaction may be operated at a temperature within a range from about 200° C. to about 400° C., a pressure within a range from about 500 psi to about 1500 psi, and a hydrogen/syncrude volume ratio within a range from about 3,000 scf/bbl to about 20,000 scf/bbl.

High Hydrogen-Donor Biomass-Derived Coal Solvents

Select biomass-derived materials are used to both dissolve and hydrogenate coal. The term "biomass" in general refers to renewable organic materials, such as wood, agricultural crops, energy crops, or wastes. The biomass-derived solvent used in the invention is capable of dehydrogenation and can be used in varying amounts in order to vary the properties of the final syncrude. In certain embodiments, the solvent is derived primarily or solely from a non-food biomass.

In certain embodiments, in order to dehydrogenate readily, the biomass-derived solvent has multi-cyclic compounds, such as phenols, cyclo-olefins, and hydroaromatics, with one or more double bonds on the ring without being fully aromatized. In certain embodiments, the biomass-derived solvent has significant amounts of multi-cyclic compounds (e.g. greater than 20%). The biomass-derived solvent may have an hydroaromatic cyclic structure that can be more fully aromatized on transfer of hydrogen during coal liquefaction. In Subsystem 3, these can be easily hydrogenated back to the hydroaromatic state for potential recycling to Subsystem 2.

In certain embodiments, modifications of biomass-derived materials are provided that significantly enhance their hydrogen donation properties and thereby improve their capabilities as coal solvents. Also, certain modifications will produce aromatic rings during transfer hydrogenation which should lead to the down-stream production of jet fuels with increased densities due to the increased content of cyclic compounds.

The high hydrogen-donor biomass-derived coal solvents described hereinbelow can be used in the coal-to-liquids process of the invention, or they can be used in any other process involving hydro-refining of coal or other carbonaceous feedstocks by transfer hydrogenation.

1) Conjugating Double Bonds in Multiply Unsaturated Fatty Acids

Linoleic acid is the most prevalent fatty acid in vegetable oils such as soybean oil and, as shown below, has two double bonds separated with a methylene group. One method to activate linoleic acid towards transfer hydrogenation of coal is to bring these two double bonds into conjugation with each other by applying any of a number of catalysts and reaction conditions. These conjugated diene systems are combinations of trans and cis configurations and their positions range between $C_8$-$C_{11}$ and $C_{10}$-$C_{13}$. These conjugated dienes should facilitate further hydrogen loss in transfer hydrogenation by generating extended conjugated systems as also shown below. This method can also be used with other oils/lipids and other multiply unsaturated fatty acids.

Activation of Linoleic Acid in Triglycerides towards Hydrogen Release by Migrating Double Bonds to Conjugated Dien System

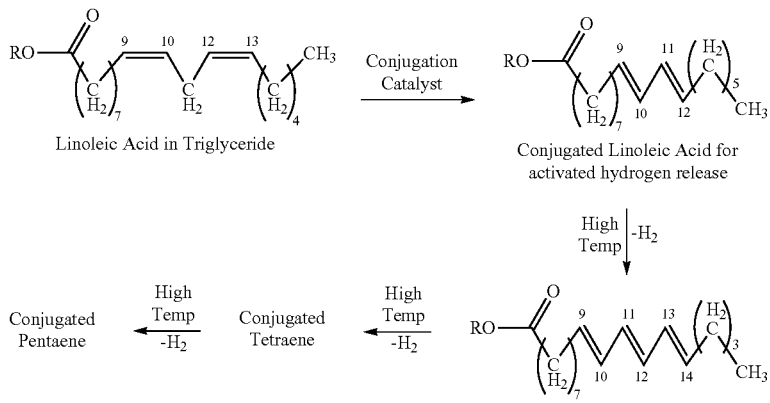

2) Generation of Appended Cyclohexene Groups in Linoleic Acid in Biomass-Derived Oils/Lipids Another method to activate linoleic acid starts with conjugated linoleic acid (CLA) or derivatives such as esters and amides and then performing a Diels Alder reaction with ethylene or substituted ethylene as shown below. This material may be called the Diels Alder product of CLA or DACLA for short. Many methods exist for preparing these appended cyclohexene derivatives from conjugated linoleic acid or, alternatively, directly from non-conjugated linoleic acid where the conjugation occurs in-situ. Diels Alder products resulting from these reactions have an appended cyclohexene group that is the focal point for effective transfer hydrogenation. Loss of two pairs of hydrogen atoms will convert this cyclohexene ring into a benzenoid aromatic ring which will be driven by the release of approximately 36 kcal./mole. Also, when processing the mixture of DACLA and solubilized coal by hydrotreating to prepare jet fuels, these aromatic rings will probably be converted to cyclohexane rings. This will provide an additional approach to generating cycloalkanes which contribute to increased fuel densities which is a highly desirable jet fuel property. It can also be seen below that continued hydrogen release after generation of the aromatic ring may occur due to extended conjugation with the aromatic ring.

Potential Activation of Linoleic Acid in Triglycerides towards Hydrogen Release by Appending Cyclohexene Ring

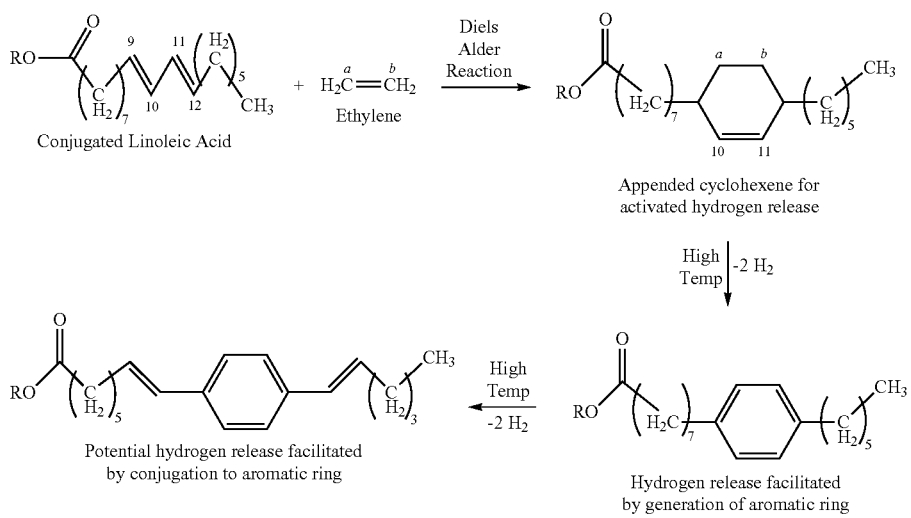

3) Generation of Appended Cyclohexene Groups in Oleic Acid in Biomass-Derived Oils/Lipids Oleic acid or derivatives such as fatty acid esters and amides have a single double bond and as shown below can also participate in a Diels Alder Reaction with butadiene or substituted butadienes to generated appended cyclohexene derivatives. As is the case in the Diels Alder reaction of conjugated linoleic acid, the appended cyclohexene ring in this oleic acid derivative is also activated towards the transfer hydrogenation of coal. This is because the loss of two moles of hydrogen will generate a benzenoid aromatic ring which provides a very strong driving force due to the release of about 36 kcal./mole of energy. As mentioned above, creation of benzenoid rings during transfer hydrogenation of coal should lead to beneficial increased amounts of cyclohexane rings in jet fuels produced during the hydrotreating step.

Activation of Oleic Acid in Triglycerides towards Hydrogen Release by Appending Cyclohexene Ring

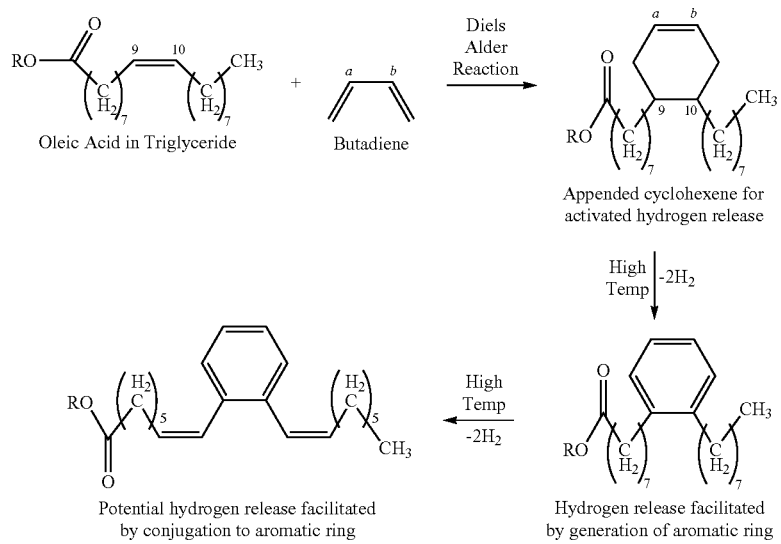

When modifying soybean oil or other oils that contain appreciable amounts of both linoleic and oleic acid by the Diels Alder cyclization approach, these oils may be reacted sequentially with appropriate ratios of ethylene and butadiene (and their derivatives) to form Diels Alder adducts of both linoleic and oleic acids or derivatives such as esters and amides of fatty acids. Sequential addition of ethylene and butadiene (or derivatives) may be used to prevent non-desired Diels Alder cross reactions of ethylene and butadiene systems with each other.

4) Dimer Acids

Dimer acids are made by treating fatty acids with various clays at high temperature in order to react at the double bonds of two fatty acids. They can form a cyclic ring, such as a cyclohexene ring, at the center of addition by Diels-Alder chemistry. They sometimes make small amounts of trimer acid also. The cyclic ring can participate in the transfer hydrogenation of coal. The cyclic ring will also be prone to aromatization and thus facilitate transfer hydrogenation. It is preferred that the cyclic ring formed contains a double bond as the saturated form would be more stable and less prone to dehydrogenation. The dimer acids in aliphatic carboxylic acid form are stable and can be heated to high temperature without decarboxylation which would lead to high pressures. However, good results could also be expected from select esters or amides of the dimer acids.

5) Esters and Amides of Fatty Acids

Fatty acid esters and fatty acid amides could also serve as hydrogen donors.

6) Bodied Soybean Oil

A similar process could be done to soybean oil or fatty acid esters directly by a process called bodying. A catalyst such as anthraquinone is used with heat in order to cyclize the fatty acids of soybean oil or fatty acid esters thereof. The temperature may be controlled so that aromatization does not take place before use in the present coal-to-liquids process. Below is the proposed structure process for such reactions along with the dehydrogenation. It is believed that double bond conjugation occurs in one of the polyunsaturated fatty acid esters and that Diels Alder chemistry generates the substituted cyclohexene ring.

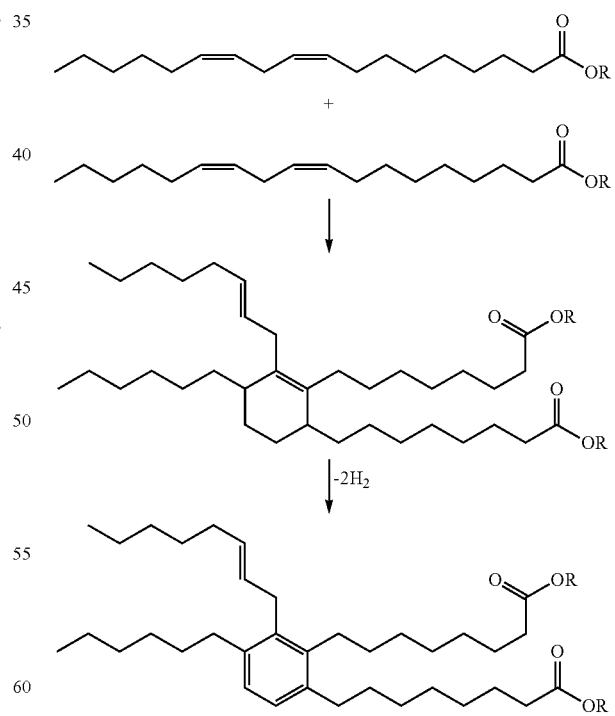

7) Materials Produced from Pine Tree Processing

Another class of hydrogen-donor biomass-derived coal solvents is materials produced from pine tree processing. The main materials are turpentine, phytosterols, and rosin acids. The main chemical in turpentine is pinene, which as the potential for hydrogen transfer during coal liquefaction.

The second pine chemical is phytosterols. The component structures vary but they are derivatives with similar structures to cholesterol. The structure contains 4-5 rings with the majority containing one double bond, allowing for potentially 3 or more moles of hydrogen per 387 grams to be transferred to coal; assuming also that some isomerization also takes place. Following is a potential dehydration/dehydrogenation process for cholesterol.

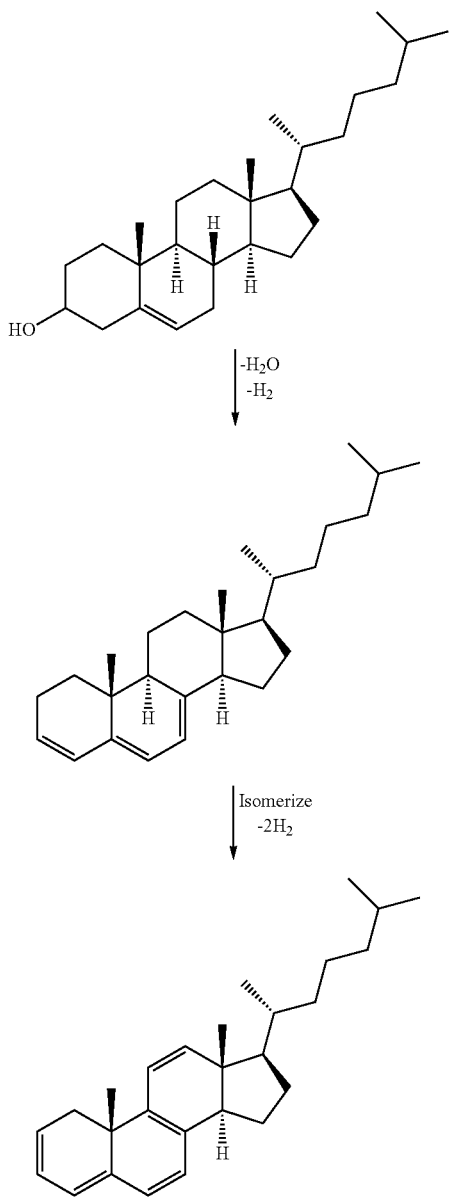

The possession of a phenolic hydroxyl is also favorable because cresol structures aid in coal solvation. The only possible concern with sterol is the high melting point of 140° C. and high boiling point of 360° C. Hydrotreatment could remediate the melting and boiling point concerns. There are many sources of phytosterols with examples including pine trees and soybean oil production.

Another pine chemical is rosin acids. Rosin acids are typically obtained from Kraft-pulping processes or gum rosin production. Small amounts can be found in other conifers or guayule.

The other rosin acids are derivatives with similar structures. Like phytosterols, rosin acids contain multiple ring structures containing one or more double bonds. This structure allows for dehydrogenation to take place, thus facilitating transfer hydrogenation.

8) Bio-Oil from Fast Pyrolysis of Biomass

In certain embodiments, the hydrogen-donor solvent is a bio-oil produced in a process of fast pyrolysis of biomass. Fast pyrolysis is a thermochemical process during which a lignocellulosic biomass such as wood, perennial grass or corn stover is rapidly heated to about 400-600° C. in the absence of oxygen, for a short residence time (e.g. 0.5-2 seconds), and then quickly cooled. The process converts the biomass into carbohydrate-based compounds, including phenols, that include condensable vapors; these are condensed into liquid bio-oil.

Any type of bio-oil produced by fast pyrolysis of biomass can be used as a solvent in the present process. For example, a bio-oil produced by fast pyrolysis of biomass is described in U.S. Patent Application No. 2016/0032196 A1 (incorporated by reference herein), published Feb. 4, 2016, assigned to Battelle Memorial Institute in Columbus, Ohio. The Battelle bio-oil has significant amounts of cyclic/aromatic compounds with good hydrogen donor capabilities. The bio-oil produced by the process can be used as a solvent, or it can be purified or further reacted in order to produce a variety of related solvents. As another example, Ensyn Renewables, Inc., Wilmington, Del., owns a number of patents related to biomass-derived pyrolysis oils and processes and equipment for producing them: U.S. Pat. Nos. 8,961,743; 8,519,205; 8,499,702; 7,905,990; 5,961,786 and 5,792,340 (all incorporated by reference herein).

The fast pyrolysis bio-oil, or its phenol-rich fractions, can be used as a solvent in its conventional non-hydrogenated form. However, in certain embodiments, the fast pyrolysis oil is partially hydrogenated for use as a solvent in the present process. For example, the fast pyrolysis oil can be used as a solvent after initial hydrotreatment.

9) Solvent Produced by Rapid Hydrothermolysis of Oils

Another hydrogen-donor biomass-derived coal solvent is produced by rapid hydrothermolysis of a variety of oils, including vegetable oils, non-edible plant oils, energy crop-derived oils, and algae. For example, a catalytic hydrothermolysis (CH) process has been developed by Advanced Research Associates and is described in U.S. Pat. No. 7,691,159, which is incorporated by reference herein. The CH process converts some of the straight-chain, aliphatic molecules to cyclics/aromatics as well as polyolefins. The patent discloses use of the resulting oils as biofuels. The present process may modify the CH oils to alter the quantity and type of cyclics/aromatics in order to optimize the coal solvent properties.

10) Tetrahydrofuran (THF) Diols

Tetrahydrofuran diols, or its esters with biomass-derived organic acids, can also be used as hydrogen transfer agents. These diols can be obtained from a number of sources. For example, epoxidized methyl linoleic rearranges to THF diol in greater than 90% yield when contacted with alumina or aqueous acid at ambient temperature, while epoxidized methyl soyate (normal variety) rearranges to 74% THF diols when exposed to acids.

Conversion of Hydrogen-Donor Biomass-Derived Coal Solvents

Optionally, the biomass-derived hydrogen-donor solvent can be chemically converted/modified to improve its usefulness as a hydrogen-donor solvent in the present coal-to-liquids process. For example, the conversion may result in at least one of: improved stability, improved resistance to decomposition at elevated temperature, and improved solvent ability.

More generally, in one embodiment the present invention relates to a method for using a biomass-derived feedstock as a hydrogen-donor. The method comprises: providing a biomass-derived feedstock; modifying the biomass-derived feedstock to improve its usefulness as a hydrogen-donor; and conducting a transfer hydrogenation process using the modified feedstock as a hydrogen-donor.

In certain embodiments, the transfer hydrogenation process is a direct coal liquefaction process. However, the use of transfer hydrogenation, using the modification of the invention, could be applicable to many other (non-coal) processes where hydrogen transfer may be needed, e.g, to stabilize biomass-derived oil or other chemical products.

A number of different methods can be used for converting/modifying a biomass-derived hydrogen-donor. For example, the DACLA solvent shown above is a carboxylic acid. The carboxylic acid can be esterified or amidified in order to stabilize the molecule by decreasing the chance for decarboxylation or improving properties through the reactant. Below are four examples of esters and amides of the DACLA solvent. Other reactants such as glycerol, ethylene glycol, propylene glycol, and other alkyl alcohols amongst many others can be used to control properties.

heated in converting to aromatic furan structures. One other way to get a THF group onto a fatty acid is to esterify with tetrahydrofurfuryl alcohol. For example, tetrahydrofurfuryl alcohol (typically made by reduction of furfural) when esterified to various carboxylic acids that themselves have hydrogen transfer abilities significantly enhances the overall hydrogen transfer properties of those esters.

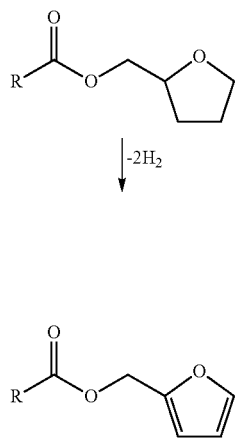

THF diols, as described above, can be used for their hydrogen transfer capabilities. For example, rearrangement of epoxidized vegetable oil will generate THF diols that can be esterified with carboxylic acids to provide extra hydrogen transfer capabilities to carboxylic acids already bearing

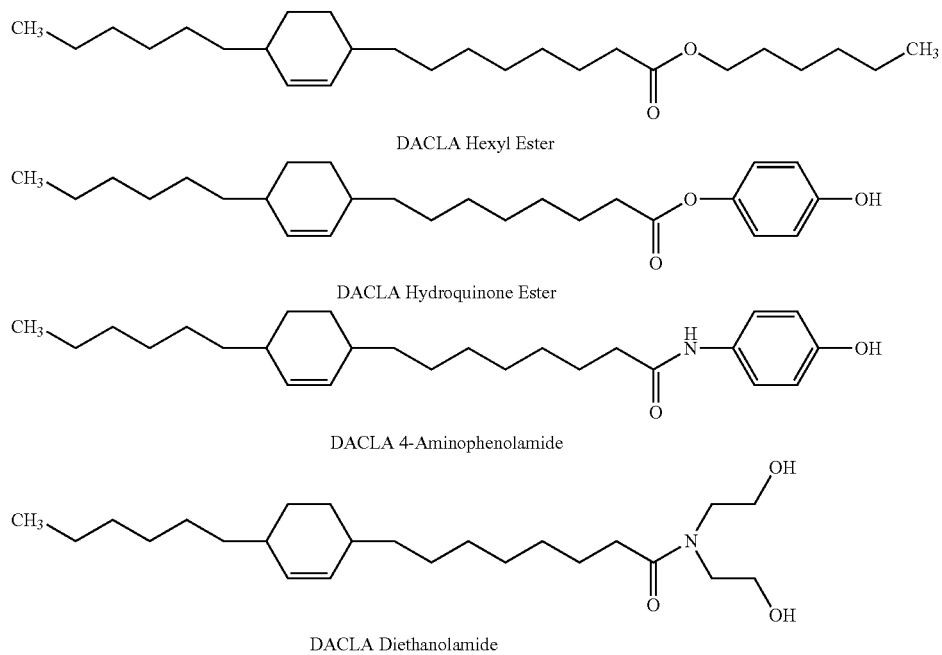

DACLA Hexyl Ester

DACLA Hydroquinone Ester

DACLA 4-Aminophenolamide

DACLA Diethanolamide

Another way to get cyclic components into the fatty acid, ester, or amide is by the formation of tetrahydrofurans at the olefinic sites where two or more double bonds are in close proximity. This enhancement is due to the fact that THF groups readily lose two moles of hydrogen when sufficiently hydrogen transfer ability. Following is an example of the process where the THF diol formed from soy fatty acid esters showing carboxylic acids already bearing hydrogen donating functionality esterified to the THF diol release two extra moles of hydrogen:

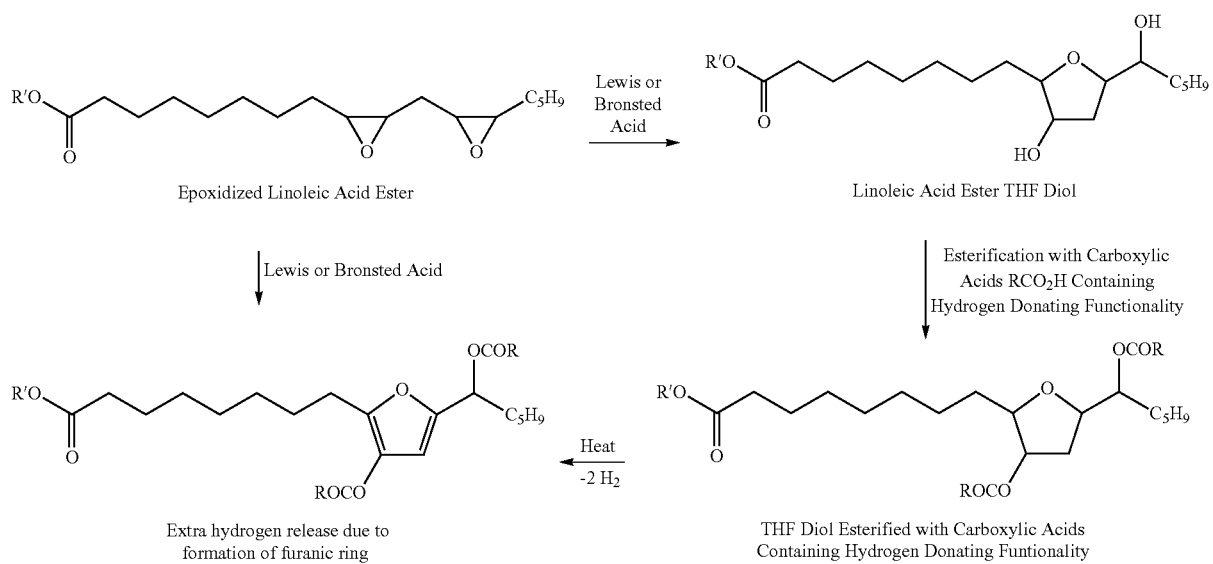

Some organic acids may undergo undesired decarboxylation during the coal-to-liquids process. These acids can be esterified or amidified in order to stabilize the molecule by decreasing the chance for decarboxylation.

In addition to DACLA and organic acids, other types of hydrogen-donor biomass-derived coal solvent can be optionally be converted for use in the present process. The following is a partial list of potential conversion chemistries available for enhancing the solvent properties of various biomass-derived solvents: esterification, hydrothermolysis, Diels-Alder reactions, dimerization, pyrolysis, hydrotreatment, and bodying. A large number of alcohols/polyols can be used for making esters of biomass-derived acids, including ethanol, butanol, hexanol, glycerol, tetrahydrofurfuryl alcohol, and 2-methylpropane-diol.

As an example of conversion of a biomass-derived solvent, three coal liquefaction tests were performed with Ohio coal. In the first test, a hydrothermolysis product of tung oil was used as the solvent, which yielded a 64.6% coal solubilization but which produced a very tacky product. In the second test, the solvent was converted to an ester with hexanol, which improved the solubility to 68.3% and which also reduced the tackiness of the product, though the liquid/solid separation was still slow. On partial hydrogenation of the solvent, in the third test, the coal solubility further increased to 72.5% and the product was easy to filter.

Second Biomass-Derived Coal Solvents

As described above, in some embodiments the biomass-derived coal solvent includes a second biomass-derived solvent in addition to the hydrogen-donor solvent. The second solvent can help to slurry/depolymerize/solvate the coal during the process of producing a syncrude from the coal. It may enhance the action of the hydrogen-donor solvent. The second solvent may provide a hydrogen-rich precursor for the jet fuel or other distillate product and/or provide a desired aliphatic-aromatic balance in the product.

Any suitable biomass-derived material can be used as the second solvent. In certain embodiments, the second solvent is a lipid. Some nonlimiting examples of lipids include soybean oil, corn oil, canola oil, brown grease, yellow grease, tallow, fish oils, cottonseed oil, rapeseed oil, sunflower oil, safflower oil, palm kernel oil, sesame oil, almond oil, argan oil, borage oil, castor oil, algal oil, coconut oil, linseed oil, grape seed oil, hemp oil, jojoba oil, macadamia oil, mustard oil, neem oil, shea butter, onka bean oil, Carinata, Jetropha, and tung oil. Combinations of different lipids, esters, amides, and mixtures thereof can be used.

In certain embodiments, the lipid(s) are converted to free fatty acids via thermal or other treatments for use as the second solvent.

In certain embodiments, the second solvent is a virgin, preferably polyunsaturated oil. For example, it may be a polyunsaturated biobased oil such as polyunsaturated soybean oil.

Surprisingly, it has been found that non-hydrogenated lipids in particular are effective to facilitate coal depolymerization and thereby improve coal liquefaction. By non-hydrogenated is meant the lipid has not been subjected to hydrogenation or partial hydrogenation.

The non-hydrogenated lipid can be combined with a hydrogen-donor solvent for use in a direct coal liquefaction process. Any suitable amounts of lipid and hydrogen-donor solvent can be used. For example, the lipid may be included in an amount of from about 5% to about 95%, and the hydrogen-donor solvent may be included in an amount from about 5% to about 95%, by total weight of the lipid and hydrogen-donor solvent.

In certain embodiments, the non-hydrogenated lipid is pretreated to cyclize the oil or otherwise improve its use for hydrogen transfer to the coal. Examples of such pretreatments include "bodying" to cyclize the oil, hydrothermal processing under supercritical conditions (e.g., a CH process by Advanced Research Associates), hydrothermal oxidation, or other ways of cyclizing. In certain embodiments, the non-hydrogenated lipid after pretreatment may be used by itself without a hydrogen donor solvent in a direct coal liquefaction process.

In certain embodiments, the non-hydrogenated lipid is used in combination with one, two or more types of coal solvent in a direct coal liquefaction process. Some examples are coal-derived solvents, converted hydrogen-donor biomass-derived coal solvents, and coal process recycle solvents. In a particular example, a non-hydrogenated soybean oil is used in combination with a coal tar distillate, an esterified organic acid, and a recycle stream from initial stage upgrading of coal syncrude.

Any suitable type of hydrogen-donor solvent may be used in combination with the non-hydrogenated lipid. Some common hydrogen donor solvents used in coal liquefaction include indane, $C_{10}$ to $C_{12}$ tetralins, decalins, hydrogenated methylnaphthalene, hydrogenated dimethylnaphthalene, hydrogenated $C_{12}$ and $C_{13}$ acenaphthenes, tetrahydro-quinolines, partially hydrogenated heterocyclic compounds and similar donor compounds. In certain embodiments, the hydrogen-donor solvent is a high hydrogen-donor biomass-derived coal solvent according to the invention as described hereinabove. Select biomass-derived materials are used to dissolve, depolymerize, and hydrogenate coal.

Coal-Derived Solvents

As described above, optionally a coal-derived solvent is mixed with the biomass-derived solvents for use in the coal dissolution. The coal-derived solvent can help to slurry/depolymerize/solvate the coal.

Any suitable coal-derived solvent can be used in the process. For example, the coal-derived solvent may be a coal tar distillate (CTD). An example of a suitable coal tar distillate is a Koppers CTD. Such a solvent may be used as a start-up solvent and then at least partially replaced by recycling a portion of the process-derived syncrude.

As described above, a portion of the coal liquefaction product from the present process (e.g., the "liquid produced after stage 1 hydrotreatment" as shown in FIGS. 2 and 3, or the coal-derived liquids prior to hydrotreatment) can also be used as a coal-derived solvent. This coal liquefaction product, or syncrude, can be optimized for use as a solvent by removing the lighter fraction (e.g., materials having a boiling point less than about 200 C) and using the middle and heavier fraction as the solvent.

Use of Biomass-Derived Solvents in Conventional Coal Hydroliquefaction Processes As described above, the biomass-derived solvents can dissolve coal and produce a syncrude that is liquid at room temperature even when no molecular (gaseous) hydrogen is used. The same solvents and their derivatives can also be used beneficially in conventional hydroliquefaction processes. In such applications, the requirement for hydrogen should be greatly reduced.

The invention claimed is:

1. A process of producing a distillate fuel from coal or a non-coal carbonaceous feedstock comprising:
    preparing a first biomass-derived coal solvent comprising a biomass-derived hydrogen-donor solvent capable of dehydrogenating during coal liquefaction and transferring a hydrogen atom to a coal fragment, wherein the hydrogen-donor solvent is derived from wood, and energy crops;
    dissolving the coal in the first biomass-derived coal solvent to form a slurry;
    heating the slurry to depolymerize the coal forming a coal fragment, dehydrogenating the hydrogen-donor solvent and transferring the hydrogen atom to the coal fragment in a transfer hydrogenation process to prevent re-polymerization of the coal fragment and form a coal-derived syncrude; and
    separating undissolved coal and mineral matter from the coal-derived syncrude;
or
    preparing a second biomass-derived coal solvent for the non-coal carbonaceous feedstock, the second biomass-derived coal solvent comprising a biomass-derived hydrogen-donor solvent capable of dehydrogenating during liquefaction of the non-coal carbonaceous feedstock and transferring a hydrogen atom to a non-coal carbonaceous feedstock fragment, wherein the hydrogen-donor solvent is derived from wood, and energy crops; and
    dissolving the non-coal carbonaceous feedstock in the second biomass-derived solvent to form a slurry;
    heating the slurry to depolymerize the coal forming a non-coal carbonaceous feedstock fragment, dehydrogenating the hydrogen-donor solvent and transferring the hydrogen atom to the non-coal carbonaceous feedstock fragment in a transfer hydrogenation process to prevent re-polymerization of the non-coal carbonaceous fragment and form a non-coal carbonaceous-derived syncrude; and
    separating undissolved non-coal carbonaceous feedstock and mineral matter from the non-coal carbonaceous-derived syncrude;
and wherein preparing the first biomass-derived coal solvent or preparing the second biomass-derived coal solvent comprises preparing the hydrogen-donor solvent comprising at least one of:
    preparing the hydrogen-donor solvent by conjugating double bonds in an oil, a lipid, or a multiply unsaturated fatty acid;
    preparing the hydrogen-donor solvent by conjugating double bonds in an oil or a lipid containing linoleic acid, linoleic ester, or linoleic amide and cyclizing the conjugated double bonds to form the oil or the lipid containing the linoleic acid, linoleic ester, or linoleic amide with an appended cyclohexene ring;
    preparing the hydrogen-donor solvent by cyclizing an oleic acid, oleic ester, or oleic amide in a triglyceride to form a triglyceride having the oleic acid, oleic ester, or oleic amide with an appended cyclohexene ring;
    preparing the hydrogen-donor solvent by reacting a double bond of two fatty acids, fatty esters, or fatty amides of a triglyceride to form a cyclohexene ring between the two fatty acids, fatty esters, or fatty amides;
    processing pine trees to obtain phytosterols and rosin acids;
    preparing a modified fast pyrolysis bio-oil by fast pyrolysis of biomass to obtain a bio-oil containing cyclic and aromatic compounds, optionally separating the bio-oil into a phenol-rich fraction, deoxygenating the bio-oil or the phenol-rich fraction, and optionally partially hydrogenating the bio-oil or the phenol-rich fraction;
    preparing a modified oil by rapid hydrothermolysis of an oil to form a hydrothemolysis oil and modifying the hydrothermolysis oil to alter quantity and type of cyclics and aromatics; and
    preparing the hydrogen-donor solvent by contacting an oil having an epoxidized fatty acid or epoxidized fatty acid ester with alumina or aqueous acid to form a modified oil having the tetrahydrofuran diol or ester.

2. The process of claim 1 which further comprises subjecting the coal-derived syncrude or the non-coal carbonaceous-derived syncrude to a hydrotreatment/hydrogenation process to produce a distillate fuel.

3. The process of claim 1 wherein the first biomass-derived coal solvent or the second biomass-derived coal solvent additionally comprises a second solvent that helps to slurry/depolymerize/solvate the coal or the non-coal carbonaceous feedstock.

4. The process of claim 3 wherein the second solvent is a polyunsaturated bio-based oil.

5. The process of claim 1 wherein a coal-derived solvent is mixed with the first biomass-derived coal solvent for dissolving the coal or with the second biomass-derived coal solvent for dissolving the non-coal carbonaceous feedstock.

6. The process of claim 1 wherein the hydrogen-donor solvent has a cyclic ring with one or more double bonds on the ring without being fully aromatized.

7. The process of claim 1 wherein the coal is dissolved in the first bio-mass derived solvent at a temperature in a range of about 300° C. to about 500° C., a pressure in a range of about 400 psi to about 1200 psi, and for a residence time in a range of about 2 min to about 120 min.

8. The process of claim 1 wherein the coal is dissolved in the first bio-mass derived solvent at a temperature in a range of about 325° C. to about 475° C., a pressure in a range of about 500 psi to about 900 psi, and for a residence time in a range of about 5 min to about 45 min.

9. The process of claim 4 wherein the polyunsaturated bio-based oil is not hydrogenated.

10. The process of claim 1 wherein the coal-derived syncrude or non-coal carbonaceous-derived syncrude has a viscosity in a range of 10 to 300 cP.

11. A process of producing a distillate fuel from coal or a non-coal carbonaceous feedstock comprising:
    preparing a first biomass-derived coal solvent comprising a biomass-derived hydrogen-donor solvent capable of dehydrogenating during coal liquefaction and transferring a hydrogen atom to a coal fragment, wherein the hydrogen-donor solvent is derived from energy crops
    dissolving the coal in the first biomass-derived coal solvent to form a slurry;
    heating the slurry to depolymerize the coal forming a coal fragment, dehydrogenating the hydrogen-donor solvent and transferring the hydrogen atom to the coal fragment in a transfer hydrogenation process to prevent re-polymerization of the coal fragment and form a coal-derived syncrude; and
    separating undissolved coal and mineral matter from the coal-derived syncrude;
    or
    preparing a second biomass-derived coal solvent for the non-coal carbonaceous feedstock, the second biomass-derived coal solvent comprising a biomass-derived hydrogen-donor solvent capable of dehydrogenating during liquefaction of the non-coal carbonaceous feedstock and transferring a hydrogen atom to a non-coal carbonaceous feedstock fragment, wherein the hydrogen-donor solvent is derived from energy crops; and
    dissolving the non-coal carbonaceous feedstock in the second biomass-derived solvent to form a slurry;
    heating the slurry to depolymerize the coal forming a non-coal carbonaceous feedstock fragment, dehydrogenating the hydrogen-donor solvent and transferring the hydrogen atom to the non-coal carbonaceous feedstock fragment in a transfer hydrogenation process to prevent re-polymerization of the non-coal carbonaceous fragment and form a non-coal carbonaceous-derived syncrude; and
    separating undissolved non-coal carbonaceous feedstock and mineral matter from the non-coal carbonaceous-derived syncrude;
    wherein the coal-derived syncrude or non-coal carbonaceous-derived syncrude has a coal solubility equal to or greater than tetralin.

12. The process of claim 1 wherein preparing the biomass-derived hydrogen-donor solvent comprises:
    preparing the biomass-derived hydrogen-donor solvent by conjugating double bonds in the oil, the lipid, or the multiply unsaturated fatty acid.

13. The process of claim 1 wherein preparing the hydrogen-donor solvent comprises:
    preparing the biomass-derived hydrogen-donor solvent by conjugating double bonds in the oil or the lipid containing linoleic acid, linoleic ester, or linoleic amide and cyclizing the conjugated double bonds to form the oil or the lipid containing the linoleic acid, linoleic ester, or linoleic amide with an appended cyclohexene ring.

14. The process of claim 1 wherein preparing the biomass-derived hydrogen-donor solvent comprises:
    preparing the biomass-derived hydrogen-donor solvent by cyclizing an oleic acid, oleic ester, or oleic amide in the triglyceride to form the triglyceride having the oleic acid, oleic ester, or oleic amide with the appended cyclohexene ring.

15. The process of claim 1 wherein preparing the biomass-derived hydrogen-donor solvent comprises:
    preparing the biomass-derived hydrogen-donor solvent by reacting a double bond of two fatty acids, fatty esters, or fatty amides of a triglyceride to form a cyclohexene ring between the two fatty acids, fatty esters, or fatty amides.

16. The process of claim 1 wherein preparing the biomass-derived hydrogen-donor solvent comprises:
    processing pine trees to obtain phytosterols and rosin acids.

17. The process of claim 1 wherein preparing the biomass-derived hydrogen-donor solvent comprises:
    preparing the modified fast pyrolysis bio-oil by fast pyrolysis of biomass to obtain the bio-oil containing cyclic and aromatic compounds, and optionally separating the bio-oil into a phenol-rich fraction, deoxygenating the bio-oil or the phenol-rich fraction.

18. The process of claim 1 wherein preparing the biomass-derived hydrogen-donor solvent comprises:
    preparing the modified oil by rapid hydrothermolysis of the oil to form the hydrothemolysis oil and modifying the hydrothermolysis oil to alter quantity and type of cyclics and aromatics.

19. The process of claim 1 wherein preparing the biomass-derived hydrogen-donor solvent comprises:
    preparing the biomass-derived hydrogen-donor solvent by contacting the oil having the epoxidized fatty acid or epoxidized fatty acid ester with alumina or aqueous acid to form the modified oil having the tetrahydrofuran diol or ester.

* * * * *